United States Patent
Maetani et al.

(10) Patent No.: US 12,281,671 B2
(45) Date of Patent: Apr. 22, 2025

(54) SLIDING COMPONENT

(71) Applicant: EAGLE INDUSTRY CO., LTD., Tokyo (JP)

(72) Inventors: Yuki Maetani, Tokyo (JP); Yoshiaki Takigahira, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 45 days.

(21) Appl. No.: 18/030,979

(22) PCT Filed: Oct. 8, 2021

(86) PCT No.: PCT/JP2021/037441
§ 371 (c)(1),
(2) Date: Apr. 7, 2023

(87) PCT Pub. No.: WO2022/080278
PCT Pub. Date: Apr. 21, 2022

(65) Prior Publication Data
US 2023/0375035 A1    Nov. 23, 2023

(30) Foreign Application Priority Data
Oct. 14, 2020 (JP) .................... 2020-172990

(51) Int. Cl.
*F16C 17/02* (2006.01)
(52) U.S. Cl.
CPC .................. *F16C 17/026* (2013.01)
(58) Field of Classification Search
CPC ............... F16C 17/026; F16J 15/3488
See application file for complete search history.

(56) References Cited

U.S. PATENT DOCUMENTS

| | | | | |
|---|---|---|---|---|
| 3,433,489 A | * | 3/1969 | Wiese | F16J 15/3432 |
| | | | | 277/408 |
| 3,589,738 A | * | 6/1971 | Tracy | F16J 15/342 |
| | | | | 277/401 |

(Continued)

FOREIGN PATENT DOCUMENTS

| | | | | |
|---|---|---|---|---|
| CH | 677266 | 10/1987 | ............ | F16J 15/34 |
| CN | 1100503 | 3/1995 | ............ | F16J 15/16 |

(Continued)

OTHER PUBLICATIONS

International Search Report and Written Opinion and International Preliminary Report on Patentability issued in PCT/JP2021/037441, dated Nov. 22, 2021, with English translation, 28 pages.

(Continued)

*Primary Examiner* — Eugene G Byrd
(74) *Attorney, Agent, or Firm* — HAYES SOLOWAY P.C.

(57) ABSTRACT

Provided is a sliding component having a small starting torque during a start operation. In a sliding component which is disposed at a relatively rotating position of a rotating machine and slides relative to the other sliding component, the sliding component is provided with a storage space which is formed on a back surface side of a sliding surface of the sliding component and into which a fluid is introduced and a plurality of through-holes which communicate with the storage space and have openings opened at the sliding surface on a side opposite to the storage space.

20 Claims, 12 Drawing Sheets

(56) References Cited

U.S. PATENT DOCUMENTS

| | | | |
|---|---|---|---|
| 3,804,424 A | 4/1974 | Gerdner | F16J 15/34 |
| 3,917,289 A * | 11/1975 | Ivanov | F16J 15/40 |
| | | | 277/408 |
| 4,534,569 A * | 8/1985 | Ishitani | F16J 15/46 |
| | | | 277/351 |
| 4,613,141 A * | 9/1986 | Heinen | F16J 15/162 |
| | | | 277/408 |
| 4,749,199 A * | 6/1988 | Gresh | F16J 15/342 |
| | | | 277/362 |
| 4,889,348 A | 12/1989 | Amundson et al. | F16J 15/34 |
| 5,092,612 A | 3/1992 | Victor et al. | F16J 15/34 |
| 5,180,173 A | 1/1993 | Kimura et al. | F16J 15/34 |
| 5,441,283 A | 8/1995 | Pecht et al. | F16J 15/34 |
| 5,492,341 A | 2/1996 | Pecht et al. | F16J 15/34 |
| 6,059,293 A * | 5/2000 | Azibert | F16J 15/3488 |
| | | | 277/358 |
| 6,149,160 A | 11/2000 | Stephens et al. | F16J 15/34 |
| 6,157,515 A | 12/2000 | Boutaghou | |
| 6,280,090 B1 | 8/2001 | Stephens et al. | |
| 6,386,547 B2 * | 5/2002 | Wu | F16J 15/3488 |
| | | | 277/408 |
| 6,505,836 B1 | 1/2003 | Toshihiko | F16J 15/34 |
| 6,619,664 B1 | 9/2003 | Metz | |
| 7,758,051 B2 * | 7/2010 | Roberts-Haritonov | |
| | | | F16J 15/342 |
| | | | 277/408 |
| 9,151,390 B2 | 10/2015 | Hosoe et al. | |
| 9,353,867 B2 | 5/2016 | Itadani et al. | F16J 15/3448 |
| 9,371,912 B2 | 6/2016 | Hosoe et al. | F16J 15/34 |
| 9,512,923 B2 | 12/2016 | Inoue et al. | F16J 16/34 |
| 9,677,670 B2 | 6/2017 | Itadani et al. | F16J 15/3412 |
| 9,765,892 B2 | 9/2017 | Itadani et al. | F16J 15/34 |
| 9,772,037 B2 | 9/2017 | Itadani et al. | F16J 15/3412 |
| 9,829,109 B2 | 11/2017 | Itadani et al. | F16J 15/40 |
| 9,841,106 B2 | 12/2017 | Itadani et al. | F16J 15/34 |
| 9,850,953 B2 | 12/2017 | Tokunaga | F16C 33/741 |
| 10,337,560 B2 | 7/2019 | Tokunaga et al. | F16J 15/40 |
| 10,415,707 B2 | 9/2019 | Bidkar et al. | |
| 10,473,220 B2 | 11/2019 | Tokunaga et al. | F16J 15/40 |
| 10,704,417 B2 | 7/2020 | Tokunaga et al. | F01D 25/16 |
| 2001/0010416 A1* | 8/2001 | Wu | F16J 15/3488 |
| | | | 277/408 |
| 2002/0079648 A1 | 6/2002 | Uth | F16J 15/34 |
| 2012/0018957 A1 | 1/2012 | Watanbe | F16J 15/34 |
| 2012/0280458 A1 | 11/2012 | Artiles et al. | F16J 15/44 |
| 2014/0197600 A1 | 7/2014 | Hosoe et al. | F16J 16/40 |
| 2014/0217676 A1 | 8/2014 | Hosoe et al. | F16J 15/34 |
| 2015/0097341 A1 | 4/2015 | Inoue et al. | F16J 15/3424 |
| 2015/0115537 A1 | 4/2015 | Tokunaga | F16J 15/34 |
| 2015/0123350 A1 | 5/2015 | Itadani et al. | F16J 15/3412 |
| 2016/0033045 A1 | 2/2016 | Itadani et al. | F16J 15/3412 |
| 2017/0350407 A1 | 12/2017 | Yamamoto et al. | F04D 29/046 |
| 2018/0003069 A1 | 1/2018 | Bidkar et al. | |
| 2018/0017101 A1* | 1/2018 | Bauduin | F16C 33/106 |
| 2018/0073394 A1 | 3/2018 | Tokunaga et al. | F01D 25/18 |
| 2018/0128377 A1 | 5/2018 | Tokunaga et al. | F16J 15/342 |
| 2018/0135699 A1 | 5/2018 | Tokunaga et al. | F16C 33/80 |
| 2018/0172162 A1 | 6/2018 | Tokunaga et al. | F16J 15/34 |
| 2018/0299015 A1 | 10/2018 | Itadani | F16J 15/3448 |
| 2019/0285115 A1 | 9/2019 | Negishi et al. | F16C 17/04 |
| 2019/0301522 A1 | 10/2019 | Negishi et al. | F16C 17/026 |
| 2022/0106891 A1 | 4/2022 | Kojima | |
| 2024/0167569 A1* | 5/2024 | Kaleshian | F16J 15/3448 |

FOREIGN PATENT DOCUMENTS

| | | | |
|---|---|---|---|
| CN | 1364987 | 8/2002 | F16J 15/40 |
| CN | 101469771 | 7/2009 | F16J 15/40 |
| CN | 102483162 | 5/2012 | F16J 15/18 |
| CN | 103104707 | 5/2013 | F16J 15/16 |
| CN | 103122998 | 5/2013 | F16J 15/16 |
| CN | 103216626 | 7/2013 | F16J 15/40 |
| CN | 103732958 | 4/2014 | F16J 15/34 |
| CN | 103765060 | 4/2014 | F16J 15/34 |
| CN | 104169622 | 11/2014 | F16J 15/34 |
| CN | 104334939 | 2/2015 | F16J 15/34 |
| CN | 104919229 | 9/2015 | F16J 15/34 |
| CN | 105793628 | 7/2016 | F16J 15/34 |
| CN | 106015571 | 10/2016 | F16J 15/16 |
| CN | 106015580 | 10/2016 | F16J 15/34 |
| CN | 106104112 | 11/2016 | F16J 15/35 |
| CN | 106352093 | 1/2017 | F16J 15/34 |
| CN | 106763778 | 5/2017 | F16J 15/16 |
| CN | 106838323 | 6/2017 | F16J 15/16 |
| CN | 107387766 | 11/2017 | F16J 15/32 |
| CN | 107407424 | 11/2017 | F16J 15/34 |
| CN | 107532725 | 1/2018 | F16J 15/34 |
| CN | 107735604 | 2/2018 | F16J 15/34 |
| DE | 2444544 | 9/1974 | F16J 15/34 |
| DE | 69113539 | 1/1992 | F16J 15/34 |
| DE | 102008038396 | 2/2010 | F16J 15/34 |
| EP | 2977654 | 1/2016 | F16J 15/34 |
| EP | 3091258 | 11/2016 | F16J 15/34 |
| EP | 3543569 | 9/2019 | F16J 15/34 |
| FR | 2342440 | 9/1977 | F16J 15/34 |
| JP | 50-45155 | 4/1975 | F16J 15/34 |
| JP | 50-144157 | 11/1975 | F16J 15/34 |
| JP | 56-15856 | 2/1981 | F16J 15/34 |
| JP | 64-46068 | 2/1989 | F16J 15/34 |
| JP | 4-50559 | 2/1992 | F16J 15/34 |
| JP | 5-164249 | 6/1993 | F16J 15/34 |
| JP | 7-12236 | 1/1995 | F16J 15/34 |
| JP | 7-71618 | 3/1995 | F16J 15/34 |
| JP | 8-502809 | 3/1996 | F16J 15/34 |
| JP | 8-303606 | 11/1996 | F16J 15/34 |
| JP | 3079562 | 6/2000 | F16J 15/34 |
| JP | 2002-508490 | 3/2002 | F16J 15/34 |
| JP | 2002-286026 | 10/2002 | F16C 17/02 |
| JP | 2009-250432 | 10/2009 | F16J 15/34 |
| JP | 2011-74931 | 4/2011 | F16J 15/34 |
| JP | 2012-2295 | 1/2012 | F16J 15/34 |
| JP | 2012-159152 | 8/2012 | F16J 15/34 |
| JP | 2014-173700 | 9/2014 | F16J 15/34 |
| JP | 2017-141962 | 8/2017 | F16J 15/34 |
| JP | 2018-138796 | 9/2018 | F16J 15/34 |
| JP | 2018-200068 | 12/2018 | F16J 15/34 |
| WO | WO9506212 | 3/1995 | F16J 15/34 |
| WO | WO0075540 | 12/2000 | |
| WO | WO2012046749 | 4/2012 | F16C 17/04 |
| WO | WO2013035502 | 3/2013 | F16J 15/34 |
| WO | WO2013035503 | 3/2013 | F16J 15/34 |
| WO | WO2013176009 | 11/2013 | F16J 15/34 |
| WO | WO2014024742 | 2/2014 | F16J 15/34 |
| WO | WO2014148317 | 9/2014 | F16J 15/34 |
| WO | WO2015199171 | 12/2015 | F16J 15/34 |
| WO | WO2015199172 | 12/2015 | F16J 15/34 |
| WO | WO2016167262 | 10/2016 | F16J 15/34 |
| WO | WO2016186015 | 11/2016 | F16J 15/34 |
| WO | WO2016186019 | 11/2016 | F16J 15/08 |
| WO | WO2016203878 | 12/2016 | F16J 15/34 |
| WO | WO2017061406 | 4/2017 | F16J 15/34 |
| WO | WO2018092742 | 5/2018 | F16J 15/34 |
| WO | WO2018105505 | 6/2018 | F16C 33/12 |
| WO | WO2020144733 A1 | 7/2020 | |

OTHER PUBLICATIONS

International Search Report and Written Opinion and International Preliminary Report on Patentability issued in PCT/JP2021/034992, dated Nov. 2, 2021, with English translation, 30 pages.

U.S. Appl. No. 18/027,600, filed Mar. 21, 2023, Suzuki et al.

European Search Report issued in related European Application Serial No. 21875392.9, dated Oct. 4, 2024, 7 pages.

European Search Report issued in related European Application Serial No. 21880017.5, dated Oct. 18, 2024, 8 pages.

Official Action issued in related U.S. Appl. No. 18/027,600 dated Sep. 24, 2024, 7 pages.

Korean Official Action issued in related Korean Application Serial No. 10-2023-70111146, dated Nov. 22, 2024, 11 pages.

(56) References Cited

OTHER PUBLICATIONS

Korean Official Action issued in related Korean Application Serial No. 10-2023-7013249, dated Dec. 8, 2024, 13 pages.

* cited by examiner (b)

(a) ROTATION DIRECTION OF ROTATING SEAL RING (b)

SLIDING COMPONENT

TECHNICAL FIELD

The present invention relates to sliding components that rotate relative to each other, for example, sliding components used for a shaft sealing device shaft-sealing a rotating shaft of a rotating machine in automobiles, general industrial machines, or other sealing fields or sliding components used for a bearing of a machine in automobiles, general industrial machines, or other bearing fields.

BACKGROUND ART

As a shaft sealing device that prevents a leakage of a sealed fluid, for example, a mechanical seal includes a pair of annular sliding components which rotates relative to each other and has sliding surfaces sliding on each other. Such a mechanical seal can seal a high-pressure sealed fluid, but it is desired to further reduce the leakage of the sealed fluid and to improve the lubricity of the sliding components at the same time.

For example, in a mechanical seal disclosed in Patent Citation 1, a pair of annular sliding components is rotatable relative to each other and a through-hole is provided to communicate with a pocket groove provided on a sliding surface of one of the sliding components. This mechanical seal supplies a fluid from the pocket groove to the sliding surface through the through-hole and exerts a force in the direction of separating the sliding surfaces of the pair of sliding components by the static pressure of the fluid. Accordingly, the leakage is reduced and the lubricity is excellent.

CITATION LIST

Patent Literature

Patent Citation 1: WO 00/75540 A (Page 5, FIG. 2)

SUMMARY OF INVENTION

Technical Problem

In the sliding component of Patent Citation 1, the pocket groove extending from an opening of the through-hole toward both circumferential sides is provided so that the fluid is supplied between the sliding surfaces in the circumferential direction. However, the pressure of the fluid in the pocket groove was non-uniform in the circumferential direction and the film of the fluid formed between the sliding surfaces tended to be non-uniform in the circumferential direction. Therefore, there is a risk that the lubrication will be partially poor especially at the time of starting at a low rotation speed, which may cause an increase in torque and wear of the sliding surface.

The present invention has been made by focusing on these problems and an object thereof is to provide a sliding component having a small starting torque during a start operation.

Solution to Problem

In order to solve the foregoing problems, a sliding component according to the present invention is a sliding component which is disposed at a relatively rotating position of a rotating machine and slides relative to an opponent component, wherein the sliding component is provided with a storage space which is formed on a back surface side of a sliding surface of the sliding component and into which a fluid is introduced and a plurality of through-holes which communicate with the storage space and have openings opened at the sliding surface on a side opposite to the storage space. According to the aforesaid feature of the present invention, the fluid is supplied between the sliding surfaces through the plurality of through-holes from the same storage space formed on the back surface side of the sliding surface during the start of the rotating machine. Accordingly, since a uniform static pressure acts between the sliding surfaces in the circumferential direction, the starting torque during the start of the rotating machine is small. Further, it is easy to change the arrangement and shape of the plurality of through-holes and to handle the demand for the pressure and amount of the fluid supplied between the sliding surfaces.

It may be preferable that the storage space is formed in an annular shape to be continuous in a circumferential direction of the sliding component. According to this preferable configuration, the fluid introduced into the storage space has substantially the same pressure. Therefore, the fluid having substantially the same pressure is supplied from the plurality of through-holes between the sliding surfaces.

It may be preferable that the storage space is a cavity in which a radial cross-section of the sliding component is continuous in a circumferential direction. According to this preferable configuration, since the sliding component has a cylindrical shape in which a cavity is formed to be continuous in the circumferential direction, the inside of the storage space is not easily affected by the environment outside the sliding components, for example, external fluid.

It may be preferable that the through-hole extends in a linear shape. According to this preferable configuration, the fluid can be efficiently supplied from the storage space between the sliding surfaces.

It may be preferable that the through-hole extends orthogonally to the sliding surface. According to this preferable configuration, a static pressure of the fluid can be efficiently applied from the storage space between the sliding surfaces.

It may be preferable that the opening on the sliding surface side of the through-hole is flush with the sliding surface. According to this preferable configuration, since the opening on the sliding surface side of the through-hole does not extend in a plane direction, the through-hole does not generate a dynamic pressure during the start or the normal operation and the initial pressure between the sliding surfaces can be easily maintained.

It may be preferable that the sliding surface is provided with a dynamic pressure generation groove. According to this preferable configuration, the driving torque can be reduced from the start to the normal operation.

It may be preferable that the sliding component is a stationary side sliding component. According to this preferable configuration, since there is no rotation at the relative rotation during the start and the normal operation, a flow is not easily generated in the fluid in the storage space and the fluid can be stably supplied from the storage space to the through-hole.

It may be preferable that the fluid is a sealed fluid. According to the ninth aspect, a fluid other than the leakage side fluid is not easily mixed with the sealed fluid.

BRIEF DESCRIPTION OF DRAWINGS

FIG. 6A is a front view illustrating a sliding component according to a second embodiment of the present invention and FIG. 6B is a radial cross-sectional view of the sliding component.

DESCRIPTION OF EMBODIMENTS

Modes for carrying out a sliding component according to the present invention will be described with reference to embodiments.

First Embodiment

A mechanical seal that adopts a sliding component according to a first embodiment of the present invention will be described with reference to FIGS. 1 to 5. Additionally, in this embodiment, an outer radial side of the sliding component constituting the mechanical seal will be described as a sealed fluid side and an inner radial side will be described as an atmosphere side. Further, a sliding surface side of the sliding component will be described as a front surface side and an opposite side facing the sliding surface will be described as a back surface side.

Figure 1:
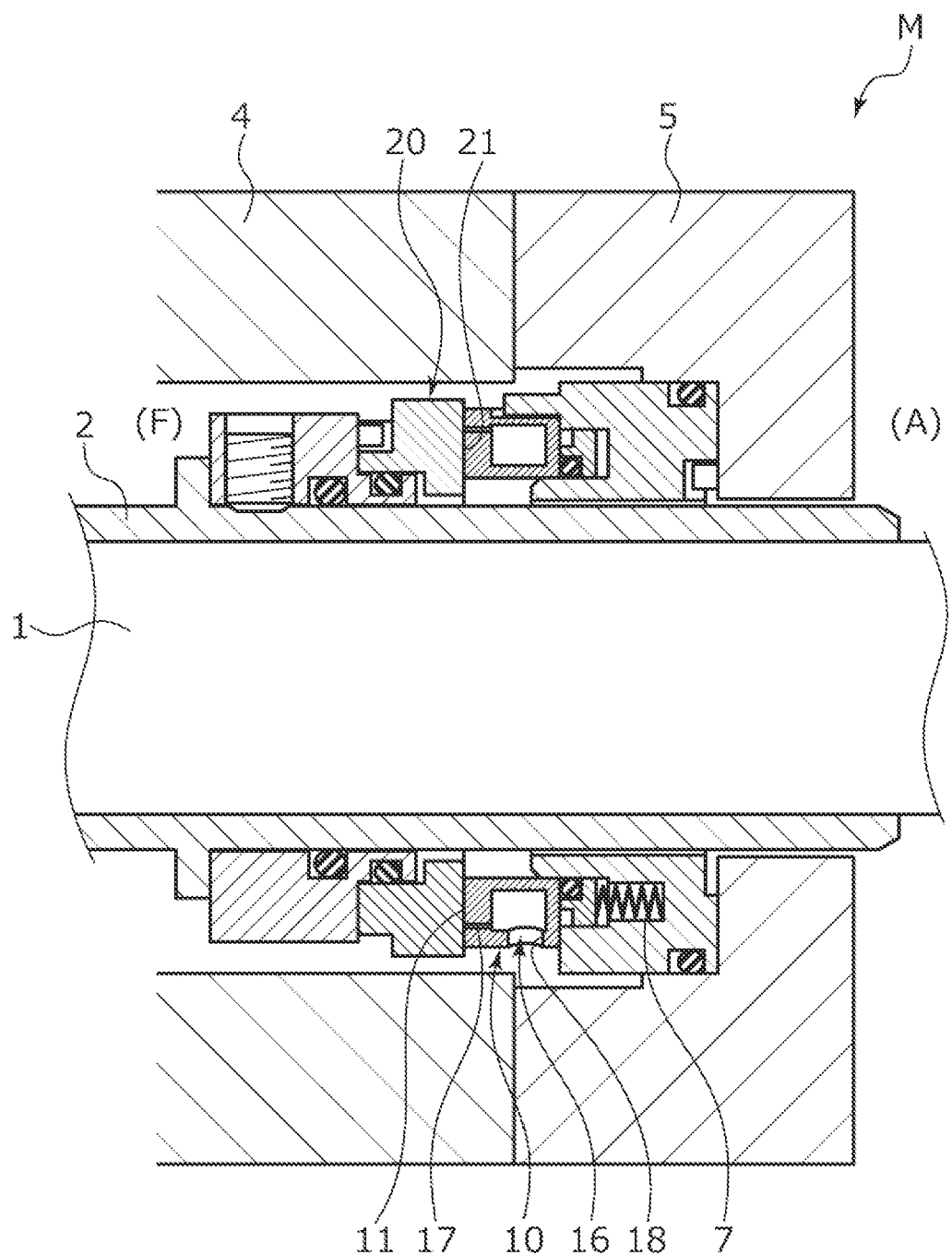
FIG. 1 is a cross-sectional view of a mechanical seal that adopts a sliding component according to a first embodiment of the present invention.

A mechanical seal M for a rotating machine illustrated in FIG. 1 is of an inside type that seals a leakage of a high-pressure sealed fluid F on the outer radial side from the outer radial side to the atmosphere A on the inner radial side. Additionally, the sealed fluid F may be a liquid or a gas.

The mechanical seal M mainly includes a stationary seal ring 10 which is an annular sliding component and a rotating seal ring 20 which is the other annular sliding component. The stationary seal ring 10 is provided on seal covers 4 and 5, fixed to a housing of an attached device, not to be rotatable and to be axially movable. The rotating seal ring 20 is attached to the rotating shaft 1 through a sleeve 2 and the rotating seal ring 20 is rotatable together with the rotating shaft 1. Further, in the mechanical seal M, a coil spring 7 urges the stationary seal ring 10 in the axial direction so that a sliding surface 11 of the stationary seal ring 10 and a sliding surface 21 of the rotating seal ring 20 slide closely with each other. Additionally, the sliding surface 21 of the rotating seal ring 20 is a flat surface, but may be provided with a groove or the like.

The stationary seal ring 10 and the rotating seal ring 20 are typically formed of SiC (hard material) or a combination of SiC (hard material) and carbon (soft material). Additionally, the present invention is not limited thereto and the sliding material can be applied as long as the sliding material is used for the mechanical seal. For example, as the hard material, ceramics other than SiC, carbon, metal material, resin material, surface modification material (coating material), composite material, and the like can also be applied.

Figure 2:
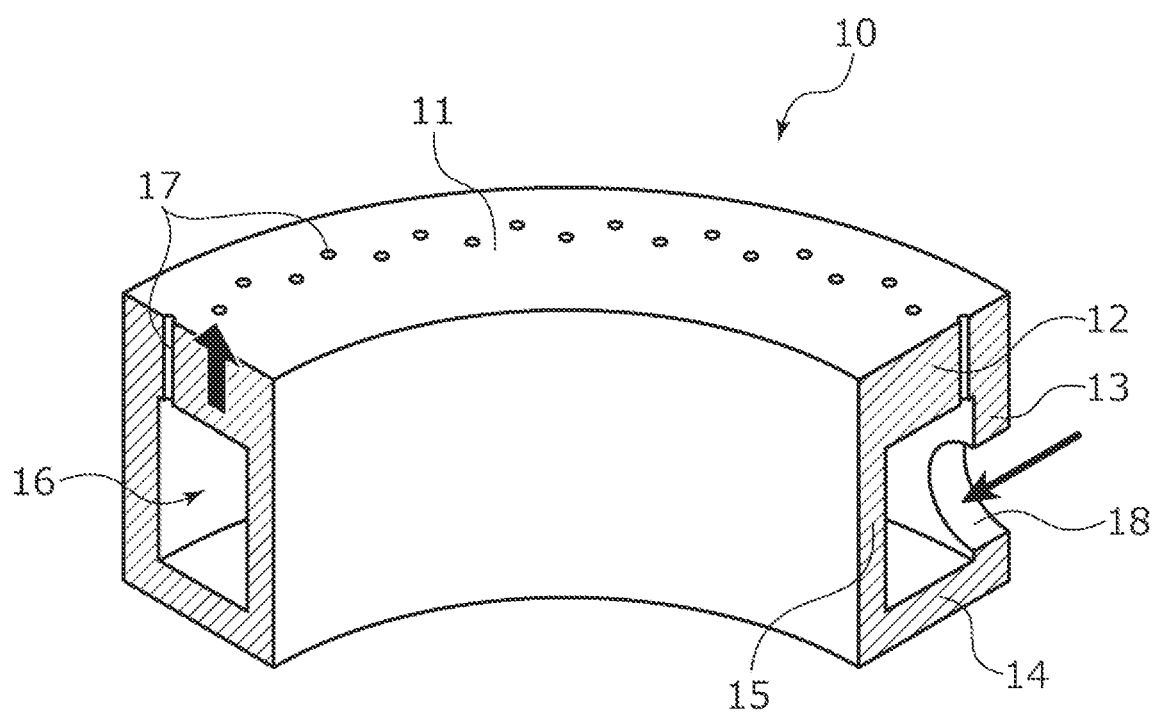
FIG. 2 is a partially cutaway perspective view of the sliding component according to the first embodiment of the present invention.
Figure 3:
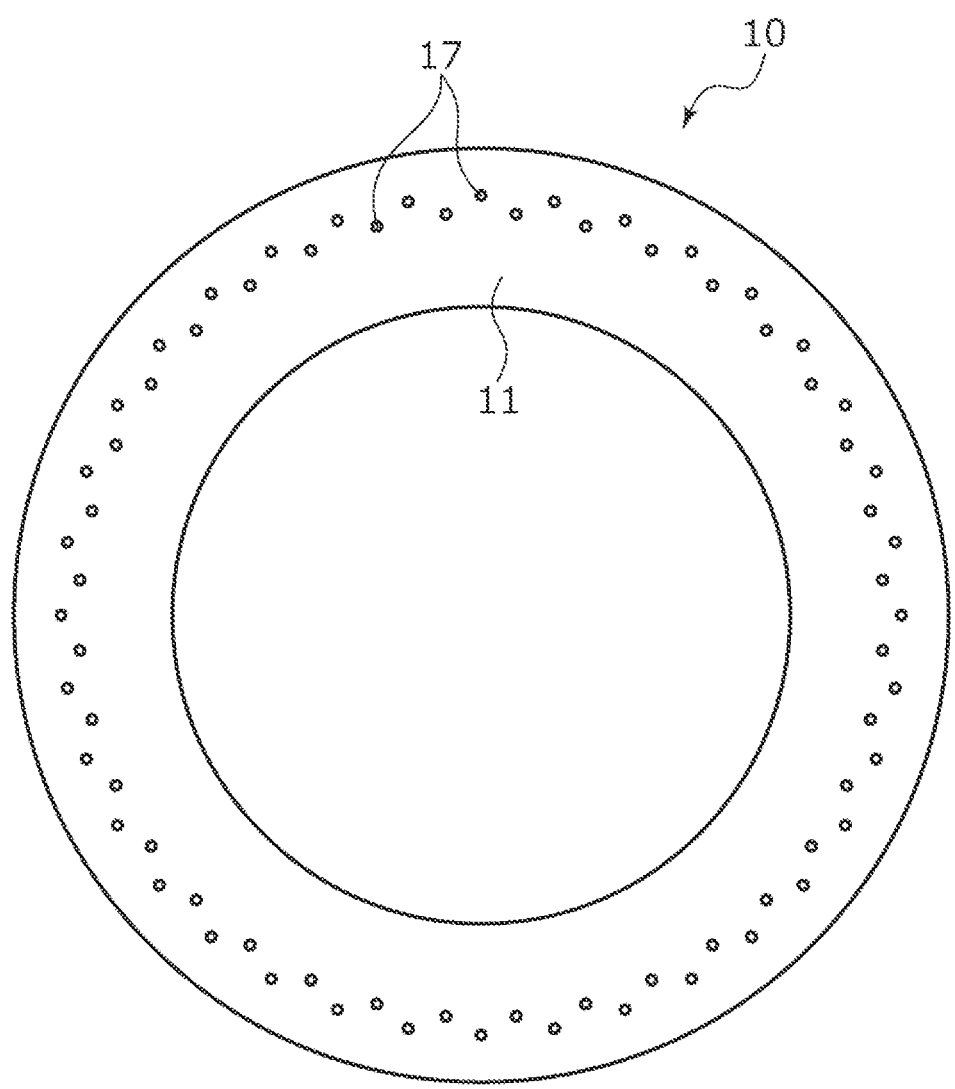
FIG. 3 is a front view of the sliding component according to the first embodiment of the present invention.
Figure 4:
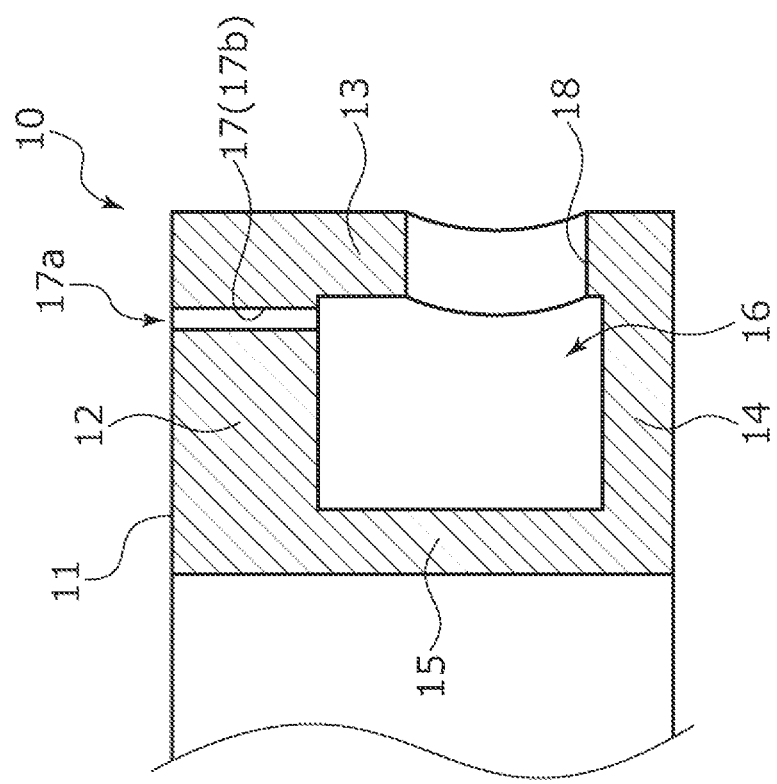
FIG. 4 is a radial cross-sectional view of the sliding component according to the first embodiment of the present invention.
Figure 5:
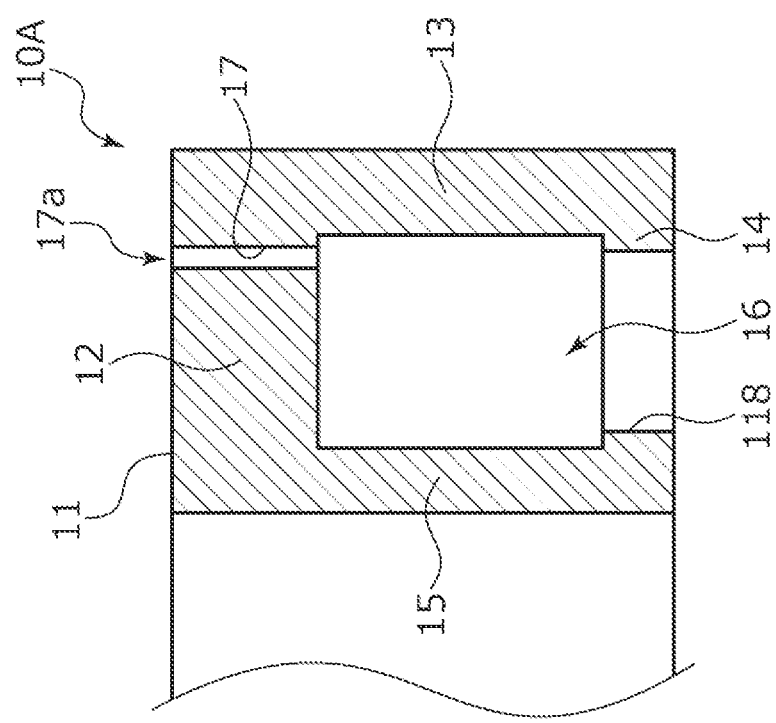
FIG. 5 is a radial cross-sectional view illustrating a modified example of the sliding component according to the first embodiment of the present invention.

Referring to FIGS. 2 to 4, the stationary seal ring 10 is an annular body in which an annular cavity is formed therein as a storage space 16. Further, the stationary seal ring 10 is formed in an annular shape in a plan view and a rectangular frame shape in a radial cross section. The stationary seal ring 10 is manufactured by a laminated molding method using a 3D printer, which is a kind of additive manufacturing device, but may be manufactured by another manufacturing method.

The stationary seal ring 10 includes an annular front surface side wall portion 12, a cylindrical outer radial side wall portion 13, an annular back surface side wall portion 14, and a cylindrical inner radial side wall portion 15. The front surface side wall portion 12 includes the sliding surface 11. The outer radial side wall portion 13 extends in the axial direction substantially orthogonally to the outer radial end portion of the front surface side wall portion 12. The back surface side wall portion 14 is disposed to face the front surface side wall portion 12 substantially orthogonally to the back surface side end portion of the outer radial side wall portion 13. The inner radial side wall portion 15 extends in the axial direction substantially orthogonally to the inner radial end portion of the back surface side wall portion 14 and the inner radial end portion of the front surface side wall portion 12.

In this embodiment, the wall portions 13 to 15 are formed to have substantially the same thickness dimension at a position facing the storage space 16. Further, the thickness dimension of the front surface side wall portion 12 is larger than the thickness dimensions of the wall portions 13 to 15.

Further, the stationary seal ring 10 is provided with the storage space 16 which is defined by the wall portions 12 to 15, is continuous in the circumferential direction, and has a rectangular shape and an annular shape in a cross-sectional view. The radial flow passage cross-sectional area of the storage space 16 is substantially the same and continuous in the circumferential direction.

As illustrated in FIGS. 2 to 4, a plurality of through-holes 17 are formed in the front surface side wall portion 12. The through-hole 17 penetrates the front surface side wall portion 12 substantially orthogonally to the sliding surface 11 and communicates with each of the storage space 16 and the sliding surface 11. Each through-hole 17 has a linear shape extending in the axial direction and a circular shape in a plan view. Further, each through-hole 17 has substantially the same radial flow passage cross-sectional area and is continuous from the storage space 16 to the opening 17a in the axial direction.

The plurality of through-holes 17 are arranged in a so-called staggered shape, in which the radial positions of the through-holes 17 adjacent to each other in the circumferential direction are arranged at predetermined intervals. Further, the plurality of through-holes 17 are arranged on the outer radial side of the sliding surface 11 in the radial direction. Additionally, the through-holes 17 are formed together when forming the stationary seal ring 10 using a 3D printer, but may be formed by perforation using a drill, a laser, or the like.

Further, as illustrated in FIGS. 3 and 4, in the through-hole 17, the opening 17a on the side of the sliding surface 11 is formed to be flush with the sliding surface 11. Further, each through-hole 17 also has substantially the same axial dimension.

The outer radial side wall portion 13 is provided with one pressure introduction portion 18 which is a through-hole penetrating in the thickness direction.

Next, the supply of the sealed fluid F between the sliding surfaces 11 and 21 during the stop, start, and normal operation of the rotating device that adopts the mechanical seal M will be described with reference to FIGS. 1 and 2.

Referring to FIG. 1, when the rotating device stops, that is, the rotating shaft 1 stops, the sum of the urging force of the coil spring 7 and the pressing force due to the pressure of the sealed fluid F acts in a direction in which the sliding surfaces 11 and 21 are relatively close to each other. On the other hand, the opening 17a of the through-hole 17 faces the sliding surface 21 and the force due to the static pressure of the sealed fluid F acts in a direction in which the sliding surfaces 11 and 21 are relatively separated from each other.

Since the force in a direction in which the sliding surfaces 11 and 21 are relatively close to each other is larger than the force in a separation direction, the sliding surfaces 11 and 21 are in contact with each other. Thus, the leakage of the sealed fluid F to the atmosphere A is prevented.

Further, in a stop state, a small amount of the sealed fluid F exists between the sliding surfaces 11 and 21 and the sealed fluid F can easily enter due to the capillary phenomenon or the like not only from the outer radial ends of the sliding surfaces 11 and 21, but also from each through-hole 17.

In addition, since the plurality of through-holes 17 are formed substantially evenly in the circumferential direction of the sliding surface 11, the sealed fluid F can be supplied substantially evenly over the circumferential direction between the sliding surfaces 11 and 21.

Further, the sealed fluid F is supplied into the storage space 16 through the pressure introduction portion 18 as indicated by the thin black arrow in FIG. 2. Therefore, the flow direction of the sealed fluid F from the pressure introduction portion 18 is less likely to directly affect the flow of the through-hole 17. Further, the sealed fluid F can be stably filled in the storage space 16.

During the stop and start of the rotating device, the sealed fluid F is supplied through each through-hole 17 to slightly flow out between the sliding surfaces 11 and 21 as indicated by the thick black arrow in FIG. 2. In this way, at the low-speed rotation during the stop and start, the static pressure of the sealed fluid F is applied from the through-hole 17 to the sliding surface 21, the sealed fluid F is supplied between the sliding surfaces 11 and 21, and the load of the sliding surface is appropriately reduced, so that lubricity is excellent.

Then, even when the rotation speed of the rotating shaft 1 increases and becomes the rotation speed during the normal operation of the rotating device, the static pressure of the sealed fluid F is applied from the through-hole 17 to the sliding surface 21 and the sealed fluid F can be supplied to flow out between the sliding surfaces 11 and 21 through each through-hole 17.

As described above, since the stationary seal ring 10 of the first embodiment has an annular shape in which the storage space 16 is continuous in the circumferential direction, the sealed fluid F introduced into the storage space 16 has substantially the same pressure. Therefore, the sealed fluid F having substantially the same pressure is supplied between the sliding surfaces 11 and 21 from the plurality of through-holes 17.

In the storage space 16, only the thickness of the front surface side wall portion 12 exists between the sliding surface 11 and the storage space 16, that is, the storage space 16 is disposed directly below the sliding surface 11. For this reason, the pressure loss or the like of the sealed fluid F supplied from the storage space 16 to the sliding surface 11 through the through-hole 17 decreases.

Further, the storage space 16 is defined by the wall portions 12 to 15 forming a rectangular frame in a radial cross-sectional view. Further, the storage space 16 is a cavity having a continuous radial cross-section. In other words, since the stationary seal ring 10 has a cylindrical shape in which a cavity is formed to be continuous in the circumferential direction, the inside of the storage space 16 is not easily affected by the environment outside the stationary seal ring 10, for example, the turbulent flow of the sealed fluid F outside the stationary seal ring 10 and the pressure in the storage space 16 can be substantially the same.

Further, the storage space 16 has substantially the same radial flow passage cross-sectional area and is continuous in the circumferential direction. Therefore, the pressure in the storage space 16 can be easily made substantially the same in the circumferential direction compared with the configuration in which the radial flow passage cross-sectional area changes.

Further, only one pressure introduction portion 18 is formed. For this reason, it is possible to reduce the influence of the sealed fluid F supplied into the storage space 16 compared with the configuration in which a plurality of pressure introduction portions are formed.

Further, the through-hole 17 extends in a linear shape and the pressure loss can be reduced compared with the configuration in which the through-hole extends in a bent line shape or a curved line shape. Therefore, the sealed fluid F can be efficiently supplied from the storage space 16 between the sliding surfaces 11 and 21.

Further, the through-hole 17 is formed in a circular shape in a cross-sectional view. Therefore, it is possible to reduce the pressure loss compared with the configuration in which the through-hole is formed in a polygonal shape in a cross-sectional view.

Further, the through-hole 17 has substantially the same flow passage cross-sectional area in the extension direction. Therefore, it is possible to reduce the pressure loss compared with the configuration in which the flow passage cross-sectional area changes.

Further, since each through-hole 17 has substantially the same axial dimension, the pressure loss generated when the sealed fluid F passes through the through-hole 17 is substantially the same. Accordingly, the static pressure of the sealed fluid F flowing out of each through-hole 17 is likely to be substantially the same.

Further, since each through-hole 17 extends in the axial direction so that an inner peripheral surface 17b is orthogonal to the sliding surface 11, it is possible to reduce the pressure loss compared with the configuration in which the inner peripheral surface of the through-hole extends obliquely with respect to the sliding surface 11. Therefore, the pressure and the flow rate of the sealed fluid F supplied through each through-hole 17 are likely to be substantially the same.

Accordingly, the circumferential pressure distribution between the sliding surfaces 11 and 21 is substantially the same. Therefore, the relative rotation between the stationary seal ring 10 and the rotating seal ring 20 can be stabilized.

Further, the through-hole 17 extends orthogonally to the sliding surface 11. Therefore, it is easy to apply a static pressure in a direction substantially orthogonal to the sliding surface 21 of the rotating seal ring 20, that is, a direction substantially the same as a direction in which the sliding surfaces 11 and 21 are relatively separated from each other compared with the configuration in which the through-hole is inclined with respect to the sliding surface 11. Accordingly, the static pressure of the sealed fluid F can be efficiently applied from the storage space 16 between the sliding surfaces 11 and 21.

Further, since the opening 17a of the through-hole 17 is flush with the sliding surface 11, for example, the opening of the through-hole is not connected to the pocket groove extending in the circumferential direction, the through-hole 17 does not generate a dynamic pressure during the normal operation in which the rotation speed is high and the initial pressure between the sliding surfaces 11 and 21 can be easily maintained.

Further, the stationary seal ring 10 provided with the storage space 16, the through-hole 17, and the pressure introduction portion 18 is provided in a stationary state in which the stationary seal ring does not rotate. Since the stationary seal ring 10 does not rotate at the relative rotation during the start and the normal operation, the flow of the sealed fluid F is not easily generated in the storage space 16 and the sealed fluid F can be stably supplied from the storage space 16 to the through-hole 17.

Further, each through-hole 17 is formed on the outer radial side of the sliding surface 11. The separation distance from each through-hole 17 to the atmosphere A is long compared with the configuration in which each through-hole 17 is formed on the inner radial side of the sliding surface 11. Accordingly, it is possible to prevent the leakage of the sealed fluid F and to expand an area in which the sealed fluid F can be supplied in the radial direction.

Further, since it is easy to change the arrangement and shape of the plurality of through-holes 17, it is easy to handle the demand for the pressure and amount of the fluid supplied between the sliding surfaces 11 and 21.

Further, the through-holes 17 are arranged in a staggered shape. For this reason, it is possible to arrange adjacent through-holes 17 close to each other compared with the configuration in which the same number of through-holes of this embodiment are arranged on one circle along the circumferential direction. Accordingly, it is possible to arrange many through-holes 17 while maintaining the structural strength of the stationary seal ring 10. Further, since it is possible to densely arrange the through-holes 17, the pressure balance between the sliding surfaces 11 and 21 in the circumferential direction is good.

Further, each through-hole 17 is the through-hole formed in the front surface side wall portion 12. Therefore, it is possible to simplify the structure compared with the configuration in which an orifice is separately attached to the stationary seal ring 10.

Further, the pressure introduction portion 18 is disposed to be located directly below the mechanical seal M in the vertical direction (see FIG. 1). Therefore, even when dust or the like is mixed in the sealed fluid F, dust or the like does not easily enter the storage space 16 through the pressure introduction portion 18. Further, even when the sealed fluid F mixed with dust or the like enters the storage space 16, the sealed fluid F sinks due to gravity and is easily discharged from the pressure introduction portion 18. For this reason, it is possible to prevent clogging of the through-hole 17. In addition, the stationary seal ring 10 is provided in a stationary state not to rotate. Thus, it is possible to maintain the position of the pressure introduction portion 18.

Additionally, in this embodiment, it has been described that the pressure introduction portion 18 is formed on the outer radial side wall portion 13 of the stationary seal ring 10, but the present invention is not limited thereto. For example, as in a stationary seal ring 10A illustrated in FIG. 5, a pressure introduction portion 118 may be formed in the back surface side wall portion 14 and may be appropriately changed.

Further, the stationary seal ring may be provided with the plurality of pressure introduction portions 18 or the plurality of pressure introduction portions 118. For example, the pressure introduction portion 18 and the pressure introduction portion 118 may be formed at one position or a plurality of positions.

Further, the axial dimension of the through-hole 17, in other words, the thickness dimension of the front surface side wall portion 12 may be appropriately changed. Accordingly, it is possible to adjust the static pressure of the sealed fluid F supplied between the sliding surfaces 11 and 21 by using the pressure loss generated when the sealed fluid F passes through the through-hole 17.

Second Embodiment

Next, a second embodiment of the sliding component will be described with reference to FIG. 6. Additionally, a description of a configuration overlapping with the same configuration as that of the first embodiment will be omitted.

Figure 6A:
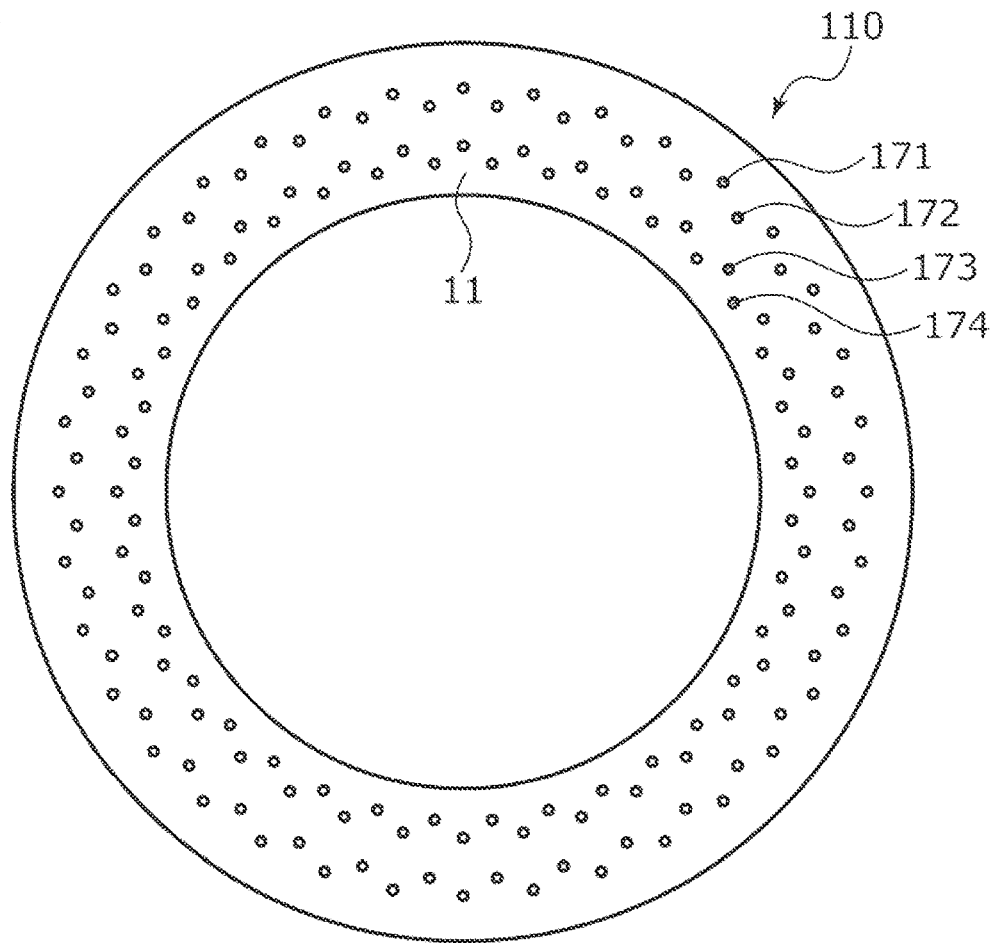
Figure 6A:
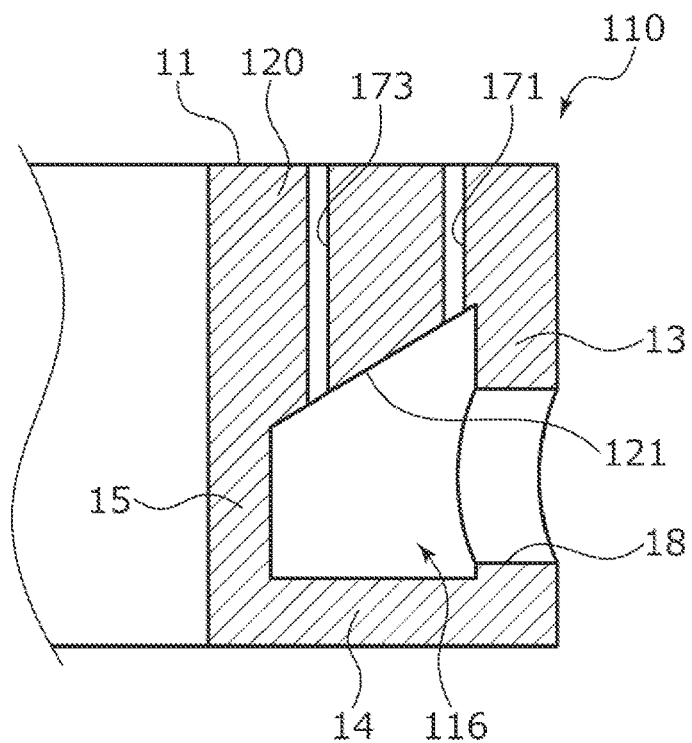

As illustrated in FIG. 6A, a plurality of through-holes 171, through-holes 172, through-holes 173, and through-holes 174 are formed in a stationary seal ring 110 from the outer radial side toward the inner radial side.

As illustrated in FIG. 6B, a back surface 121 of a front surface side wall portion 120 is inclined and the thickness dimension thereof gradually increases from the outer radial side to the inner radial side. For this reason, the through-hole 171 has the shortest axial dimension in the through-holes 171 to 174. Further, the dimension becomes longer in order of the through-hole 172 and the through-hole 173 and the dimension is the longest in the through-hole 174.

Accordingly, in the stationary seal ring 110, the through-holes 171 to 174 are formed in a wide area in the radial direction compared with the stationary seal ring 10 of the first embodiment. For this reason, the sealed fluid F can be stably supplied between the sliding surfaces 111 and 21.

Further, the through-holes 171 to 174 have a longer axial dimension toward the inner radial side. For this reason, the pressure loss increases toward the inner radial side. In other words, since the static pressure of the sealed fluid F supplied between the sliding surfaces 111 and 21 through the through-hole near the inner radial side is reduced, the static pressure of the sealed fluid F between the sliding surfaces 111 and 21 is larger on the outer radial side than the inner radial side. In this way, it is possible to reduce the leakage amount and improve the lubricity at the same time.

Third Embodiment

Next, a third embodiment of the sliding component will be described with reference to FIG. 7. Additionally, a description of a configuration overlapping with the same configuration as those of the first and second embodiments will be omitted.

Figure 7:
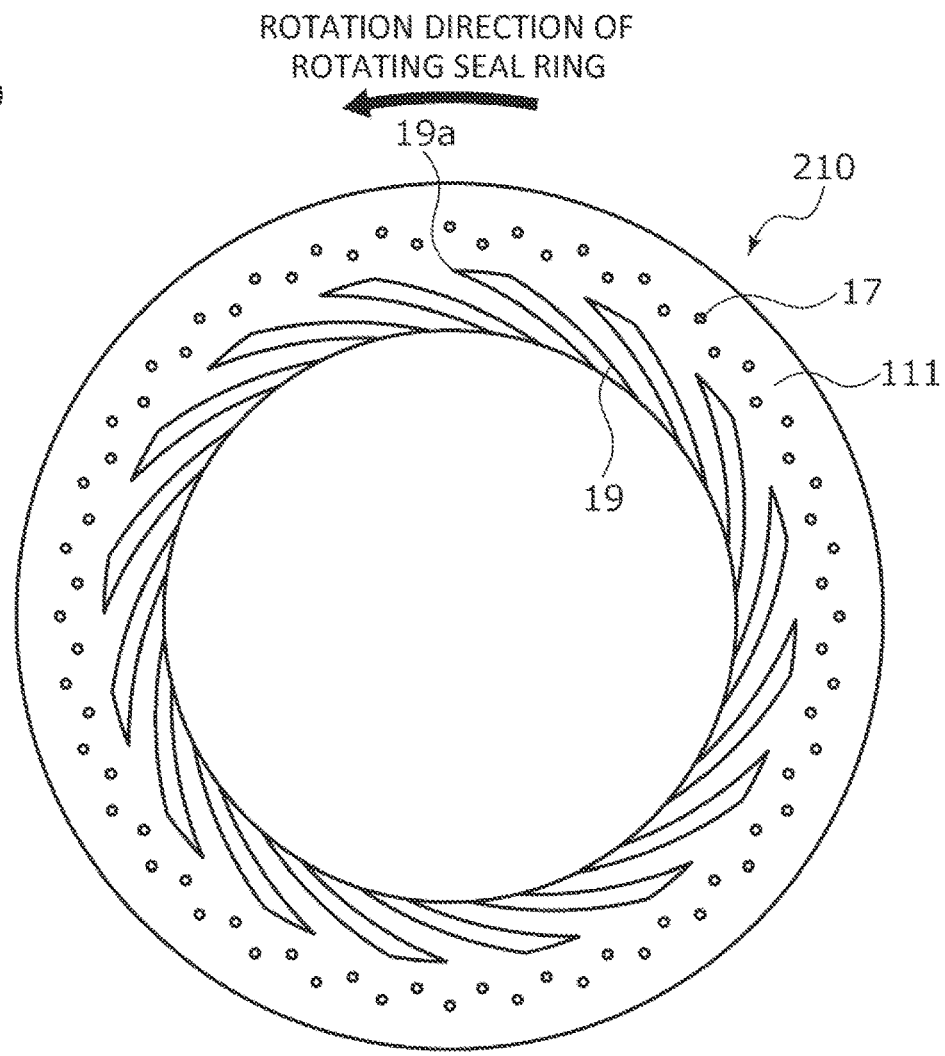
FIG. 7A is a front view illustrating a sliding component according to a third embodiment of the present invention and FIG. 7B is a radial cross-sectional view of the sliding component.
Figure 7:
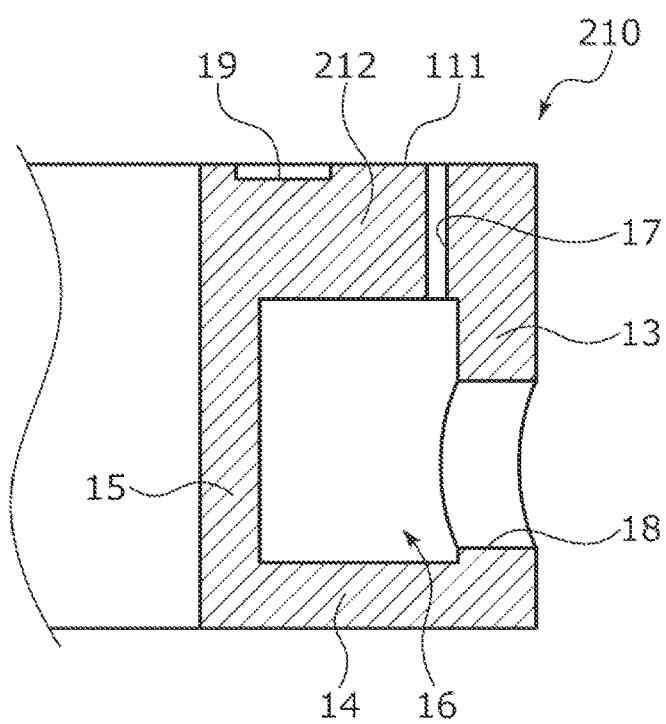

As illustrated in FIG. 7, a plurality of spiral dynamic pressure generation grooves 19 are formed on a sliding surface 211 of a stationary seal ring 210. The dynamic pressure generation groove 19 extends toward the outer radial side while being curved along the rotation direction of the rotating seal ring 20 from the inner radial end of the stationary seal ring 210. Further, the dynamic pressure generation grooves 19 are arranged at predetermined intervals in the circumferential direction of the sliding surface 211.

Referring to FIG. 7A, the dynamic pressure generation groove 19 can generate a dynamic pressure in such a manner that the fluid flowing into the dynamic pressure generation groove 19 by the same rotation is concentrated at an acute corner portion 19a located on the rotation direction side of the rotating seal ring 20 and the outer radial side.

Accordingly, the static pressure of the sealed fluid F supplied between the sliding surfaces 211 and 21 by the through-hole 17 as in the first embodiment mainly acts as a force of separating the sliding surfaces 211 and 21 at a low-speed rotation during the start of the rotating machine. On the other hand, a dynamic pressure generated by the dynamic pressure generation groove 19 mainly acts as a force of slightly separating the sliding surfaces 211 and 21 at a high-speed rotation during the normal operation. In this way, the driving torque can be reduced from the start to the normal operation.

Fourth Embodiment

Next, a fourth embodiment of the sliding component will be described with reference to FIGS. 8 to 10. Additionally, a description of a configuration overlapping with the same configuration as those of the first to third embodiments will be omitted.

Figure 8:
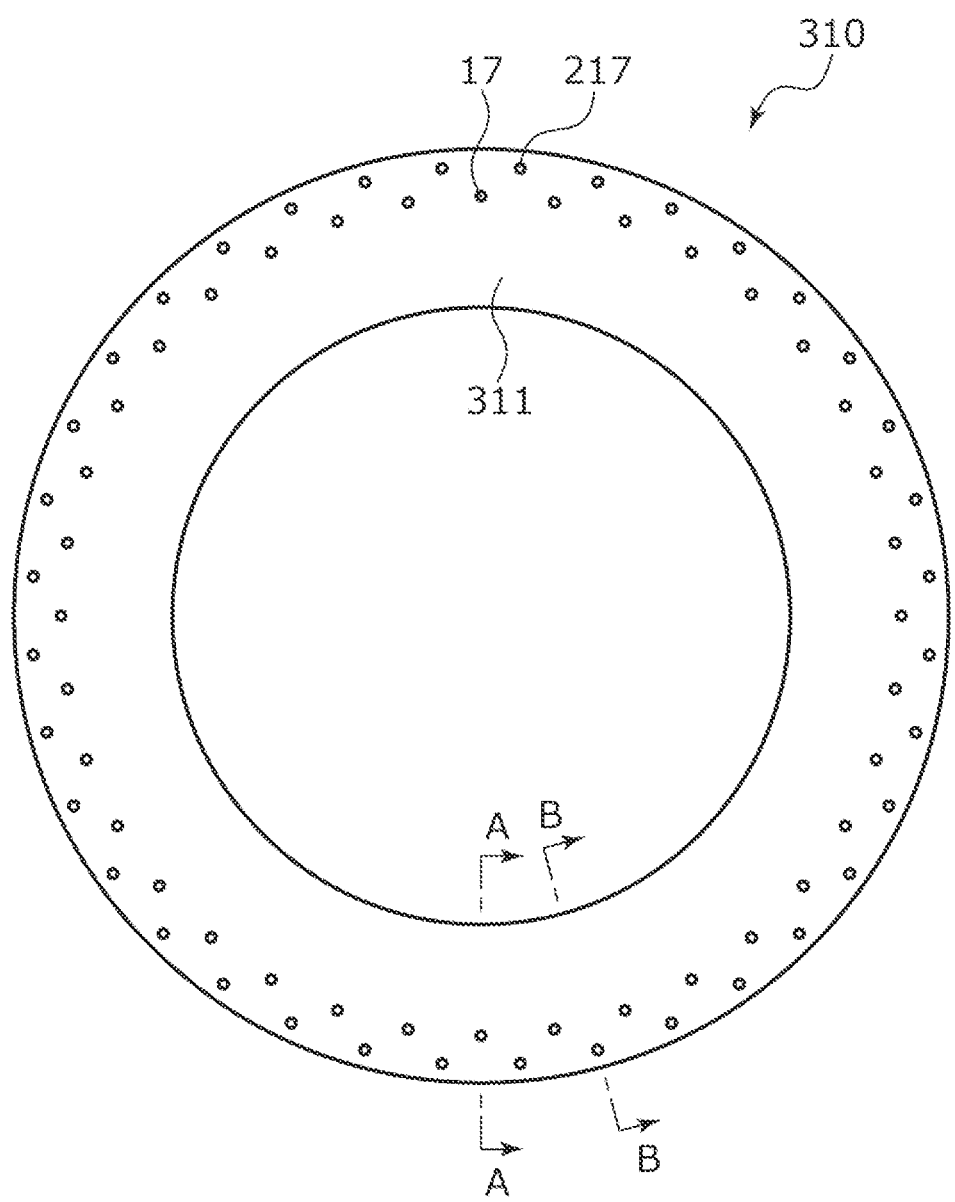
FIG. 8 is a front view of a sliding component of a fourth embodiment according to the present invention.

As illustrated in FIG. 8, openings 17a and 217a of through-holes 17 and 217 (see FIGS. 9 and 10) are arranged on a sliding surface 311 of a stationary seal ring 310 in a staggered shape. The openings 17a and 217a are arranged in the circumferential direction on the outer radial side of the sliding surface 311 in the radial direction.

Figure 9:
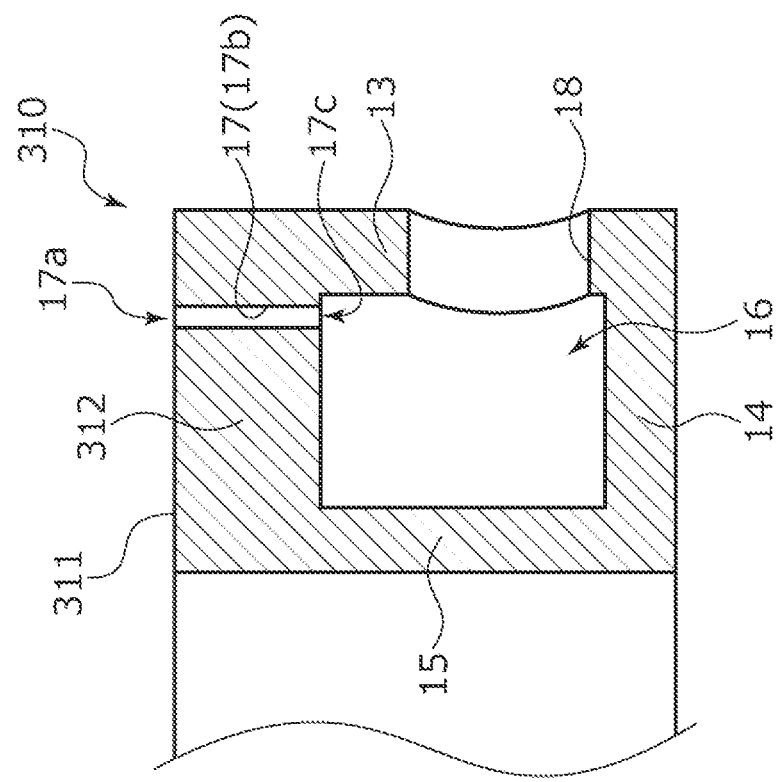
FIG. 9 is a cross-sectional view taken along a line A-A of FIG. 8.
Figure 10:
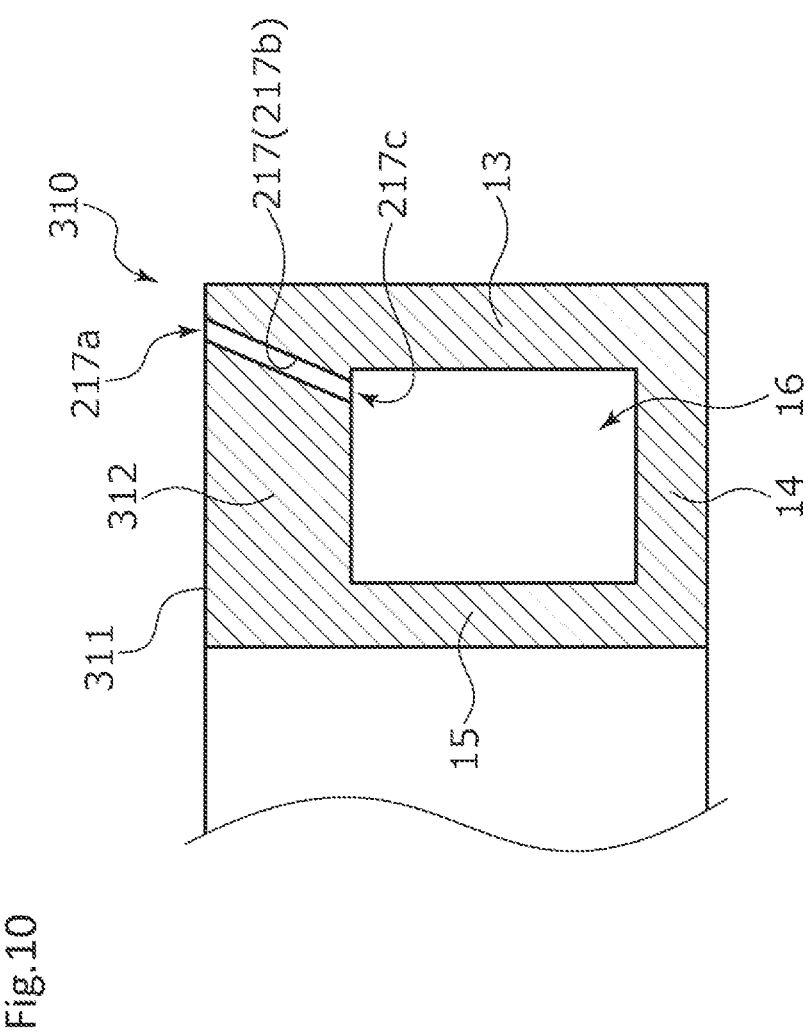
FIG. 10 is a cross-sectional view taken along a line B-B of FIG. 8.

Referring to FIGS. 9 and 10, the openings 217c communicating with the storage space 16 of the through-hole 217 are alternately arranged and formed on the same circle as the openings 17c communicating with the storage space 16 of the through-hole 17. The through-hole 217 is inclined from the opening 217c to the outer radial side and extends linearly toward the sliding surface 311. Further, the through-hole 217 is continuous to an opening 217a of the sliding surface 311.

Accordingly, the opening 217a of the through-hole 217 can be disposed on the outer radial side, that is, the side of the sealed fluid F in relation to the storage space 16. Therefore, the separation distance to the atmosphere A is longer than that of the first embodiment. Thus, it is possible to prevent the leakage of the sealed fluid F and to expand the area in which the sealed fluid F can be supplied in the radial direction.

Further, the through-hole 217 is inclined and has an axial dimension longer than the axial dimension of the through-hole 17, so that the pressure loss is larger than the through-hole 17. Further, since a small static pressure is supplied to the sliding surface 311, the leakage toward the sealed fluid F does not easily occur.

Further, the opening 217a of the through-hole 217 is flush with the sliding surface 311. Therefore, a dynamic pressure is not generated during the normal operation in which the rotation speed is high and the initial pressure between the sliding surfaces 311 and 21 is easily maintained.

Although the embodiments of the present invention have been described above with reference to the drawings, the specific configuration is not limited to these embodiments, and is included in the present invention even if there are changes or additions within the scope of the scope of the present invention.

For example, in the above-described embodiments, it has been described that the sliding component is applied to the mechanical seal, but the present invention is not limited thereto. For example, the sliding component may be applied to one other than the mechanical seal such as a sliding bearing.

Further, it has been described that the mechanical seal is of an inside type, but the present invention is not limited thereto. For example, the mechanical seal may be of an outside type.

Further, it has been described that the sealed fluid is the high-pressure liquid, but the present invention is not limited thereto. For example, the sealed fluid may be a mist obtained by mixing a liquid and a gas, a gas, or a low-pressure fluid.

Further, it has been described that the leakage side fluid is the atmosphere, but the present invention is not limited thereto. For example, the leakage side fluid may be a liquid, a mist obtained by mixing a liquid and a gas, or a fluid having a pressure higher than the sealed fluid.

Further, it has been described that the sliding component provided with the storage space and the through-hole is the stationary seal ring, but the present invention is not limited thereto. For example, the sliding component may be the rotating seal ring.

Figure 11:
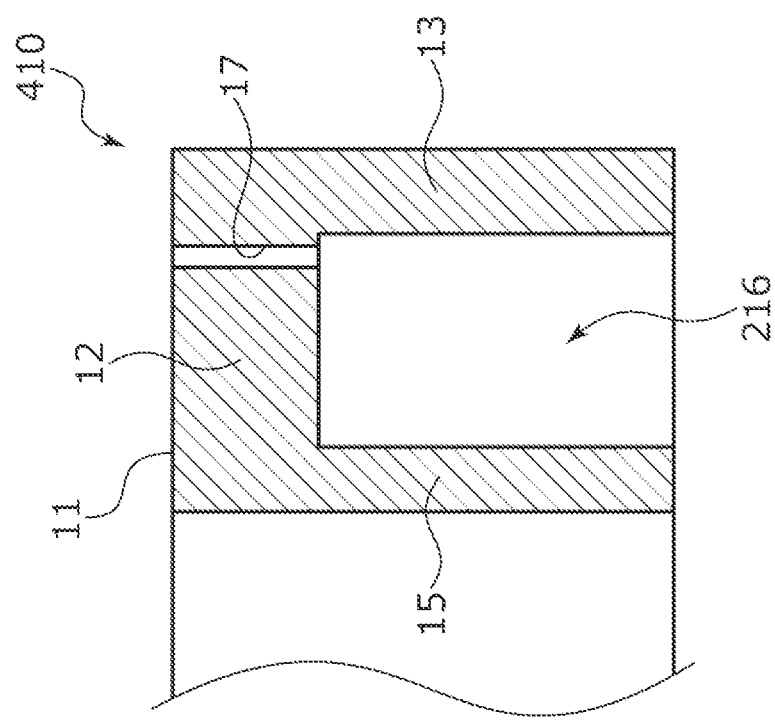
FIG. 11 is a radial cross-sectional view illustrating a sliding component according to a first additional embodiment of the present invention.

Further, it has been described that the storage space is defined by the wall portions arranged on all sides, but the present invention is not limited thereto. For example, as in a stationary seal ring 410 illustrated in FIG. 11, the back surface side between the outer radial side wall portion 13 and the inner radial side wall portion 15 may be open and a storage space 216 defined by each of the wall portions 12, 13, and 15 may directly communicate with the back surface side of the stationary seal ring 310. In the case of such a configuration, it is desirable to use a housing, a casing, or the like to narrow the flow passage communicating with the back surface side of the storage space 216 so that the fluid in the storage space 216 is less likely to be affected by the external fluid.

Further, it has been described that the storage space is defined by the wall portions arranged in a rectangular frame shape in a cross-sectional view, but the present invention is not limited thereto. For example, the cross-sectional shape may be a polygonal frame shape other than a rectangular frame or a D shape in a cross-sectional view in which a C-shaped wall portion is continuous with respect to the front surface side wall portion and the cross-sectional shape may be appropriately changed if the wall portions are arranged in a cylindrical shape.

Further, it has been described that the storage space is a space having a rectangular shape in a cross-sectional view, but the present invention is not limited thereto. For example, the storage space may have another polygonal shape or a circular shape or the shape may be appropriately changed.

Further, it has been described that the storage space is continuous in the circumferential direction, but the present invention is not limited thereto. For example, the storage space may be divided into a plurality of parts in the circumferential direction. In this case, it is desirable that a communication hole is formed in a separation wall to communicate the adjacent storage spaces. In addition, the circumferential flow passage cross-sectional area may change.

Figure 12:
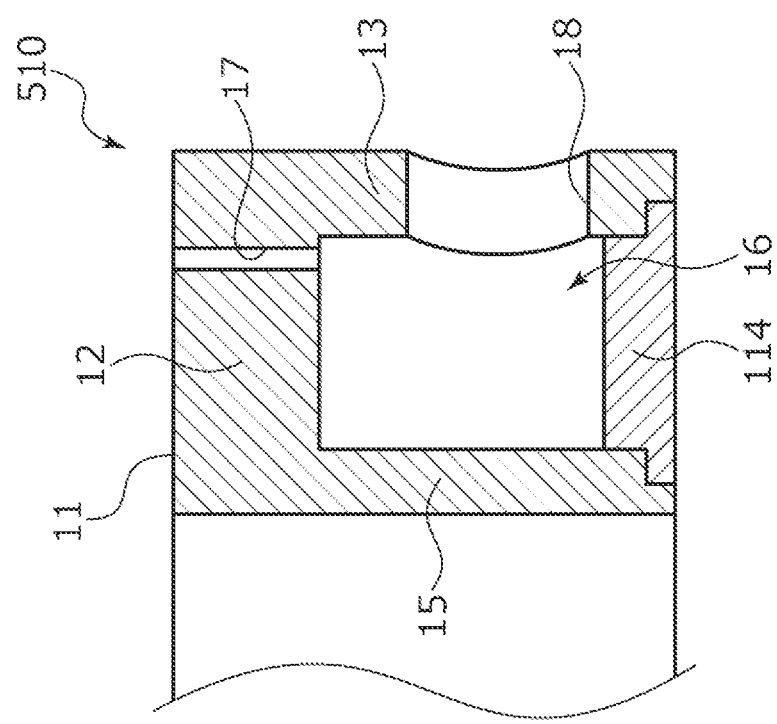
FIG. 12 is a radial cross-sectional view illustrating a sliding component according to a second additional embodiment of the present invention.

Further, the stationary seal ring may be composed of a plurality of members. For example, as in a stationary seal ring 510 illustrated in FIG. 12, the stationary seal ring may be formed by fixing a lid member 114 as a separate member to a base member including the wall portions 12, 13, and 15.

Further, it has been described that the through-hole extends in a linear shape, but the present invention is not limited thereto. For example, if the through-hole communicates with each of the sliding surface and the storage space, the through-hole may be formed in a curved line shape or a shape bent in at least one position. Alternatively, the through-hole may be appropriately changed.

Further, it has been described that the through-holes are arranged in a staggered shape, but the present invention is not limited thereto. For example, the through-holes may be arranged in series or may be arranged in parallel in the same radial direction. Alternatively, the through-holes may be appropriately changed.

Further, it has been described that the through-holes are arranged at predetermined intervals, but the present invention is not limited thereto. For example, the through-holes may be arranged evenly instead of the predetermined intervals or may be arranged unevenly.

Further, it has been described that the through-hole has a circular shape in a cross-sectional view, but the present invention is not limited thereto. For example, the through-hole may have a polygonal shape or a star shape, and the shape may be changed as appropriate.

Further, it has been described that the through-hole has substantially the same flow passage cross-sectional area, but the present invention is not limited thereto. For example, the flow passage cross-sectional area may change.

Further, it has been described that the fluid is the sealed fluid, but the present invention is not limited thereto. For example, the fluid may be other than the sealed fluid supplied through the pressure introduction portion.

Further, it has been described that the dynamic pressure generation groove has a spiral shape, but the present invention is not limited thereto. For example, the dynamic pressure generation groove may be a Rayleigh step groove which is a positive dynamic pressure generation groove, a reverse Rayleigh groove, a herringbone groove, a rectangular groove, or a dimple which is a negative dynamic pressure generation groove, or a combination thereof. Alternatively, the dynamic pressure generation groove may be appropriately changed.

REFERENCE SIGNS LIST

10, 10A Stationary seal ring (sliding component)
11 Sliding surface
16 Storage space (cavity)
17 Through-hole
17a Opening (opening on sliding surface side)
18 Pressure introduction portion
19 Dynamic pressure generation groove
20 Rotating seal ring (opponent component)
21 Sliding surface
110 to 510 Stationary seal ring (sliding component)
111 to 311 Sliding surface
118 Pressure introduction portion
171 to 174 Through-hole
216 Storage space
217 Through-hole
A Atmosphere
F Sealed fluid (fluid)
M Mechanical seal

The invention claimed is:

1. A sliding component which is disposed at a relatively rotating position of a rotating machine and slides relative to an opponent component,
   wherein the sliding component is provided with a storage space which is formed on a back surface side of a sliding surface of the sliding component and a plurality of through-holes which communicate with the storage space and have openings opened at the sliding surface on a side opposite to the storage space,
   wherein the storage space communicates with a communication passage which is provided separately from the through-holes, and
   wherein the communication passage communicates with a sealed fluid side space which is formed on an outer diameter side or an inner diameter side of the sliding component and in which the sealed fluid exists.

2. The sliding component according to claim 1,
   wherein the storage space is formed in an annular shape to be continuous in a circumferential direction of the sliding component.

3. The sliding component according to claim 1,
   wherein the storage space is a cavity in which a radial cross-section of the sliding component is continuous in a circumferential direction.

4. The sliding component according to claim 1,
   wherein the through-hole extends in a linear shape.

5. The sliding component according to claim 1,
   wherein the through-hole extends orthogonally to the sliding surface.

6. The sliding component according to claim 1,
   wherein the opening on the sliding surface side of the through-hole is flush with the sliding surface.

7. The sliding component according to claim 1,
   wherein the sliding surface is provided with a dynamic pressure generation groove.

8. The sliding component according to claim 1,
   wherein the sliding component is a stationary side sliding component.

9. The sliding component according to claim 1,
   wherein the fluid is a sealed fluid.

10. The sliding component according to claim 2,
    wherein the storage space is a cavity in which a radial cross-section of the sliding component is continuous in a circumferential direction.

11. The sliding component according to claim 2,
    wherein the through-hole extends in a linear shape.

12. The sliding component according to claim 2,
    wherein the through-hole extends orthogonally to the sliding surface.

13. The sliding component according to claim 2,
    wherein the opening on the sliding surface side of the through-hole is flush with the sliding surface.

14. The sliding component according to claim 2,
    wherein the sliding surface is provided with a dynamic pressure generation groove.

15. The sliding component according to claim 2,
    wherein the sliding component is a stationary side sliding component.

16. The sliding component according to claim 2,
    wherein the fluid is a sealed fluid.

17. The sliding component according to claim 3, wherein the through-hole extends in a linear shape.

18. The sliding component according to claim 3, wherein the through-hole extends orthogonally to the sliding surface.

19. The sliding component according to claim 3, wherein the opening on the sliding surface side of the through-hole is flush with the sliding surface.

20. The sliding component according to claim 3, wherein the sliding surface is provided with a dynamic pressure generation groove.

* * * * *